US005505893A

United States Patent [19]

Connors, Jr.

[11] Patent Number: 5,505,893

[45] Date of Patent: Apr. 9, 1996

[54] METHOD FOR MANUFACTURING AND REPAIRING MOLTEN METAL CONTAINMENT VESSELS

[75] Inventor: Charles W. Connors, Jr., Chicago, Ill.

[73] Assignee: Magneco/Metrel, Inc., Addison, Ill.

[21] Appl. No.: 328,898

[22] Filed: Oct. 25, 1994

Related U.S. Application Data

[62] Division of Ser. No. 153,266, Nov. 15, 1993, which is a continuation of Ser. No. 893,377, Jun. 4, 1992, abandoned, which is a continuation of Ser. No. 673,954, Mar. 22, 1991, abandoned.

[51] Int. Cl.$^6$ .............................. B32B 35/00; C21B 7/06; C21C 5/44; F27D 1/16

[52] U.S. Cl. .............................. 264/30; 249/62; 249/144; 249/174; 264/31; 264/35; 264/36; 264/317; 264/333; 266/196; 266/281

[58] Field of Search .............................. 264/30, 31, 35, 264/36, 313, 316, 317, 319, 332, 333, 80, 334, 338, 337, 344, DIG. 44; 266/281, 196; 164/56.1, 57.1; 249/61, 62, 142, 144, 174

[56] References Cited

U.S. PATENT DOCUMENTS

| | | |
|---|---|---|
| 1,552,064 | 9/1925 | Lake . |
| 1,643,425 | 9/1927 | Summey . |

(List continued on next page.)

FOREIGN PATENT DOCUMENTS

| | | |
|---|---|---|
| 116722 | 3/1943 | Australia . |
| 0064863 | 11/1982 | European Pat. Off. . |
| 2435532 | 2/1976 | Germany . |
| 2512841 | 9/1976 | Germany . |
| 2659205 | 7/1977 | Germany . |
| 44-9646 | 5/1969 | Japan . |
| 53-113808 | 10/1978 | Japan . |
| 57-72758 | 5/1982 | Japan . |
| 59-156969 | 9/1984 | Japan . |
| 60-96580 | 5/1985 | Japan . |
| 60-137865 | 7/1985 | Japan . |
| 969453 | 10/1982 | U.S.S.R. . |
| 1415431 | 11/1975 | United Kingdom . |
| 1513210 | 6/1978 | United Kingdom . |
| 2105828 | 3/1983 | United Kingdom . |
| 85/02397 | 6/1985 | WIPO . |

OTHER PUBLICATIONS

"Stay-Form" Spec-Data Sheet by Alabama Metal Industries Corp. (Feb. 1989).

Abstract of Japanese publication JP63154258, Patent Abstracts of Japan, vol. 012416, (M-759) published Apr. 11, 1988.

U.S. Patent Application Ser. No. 08/156,563 filed Nov. 22, 1993 by Connors Jr. et al.

U.S. Patent Application Ser. No. 08/153,266 filed Nov. 15, 1993 by Connors Jr.

*Primary Examiner*—Karen Aftergut
*Attorney, Agent, or Firm*—Willian Brinks Hofer Gilson & Lione

[57] ABSTRACT

A method of manufacturing an open top, walled member for containing a molten metal, especially a flowing molten metal or reconstructing a worn or damaged member. The method includes the step of forming the inner walls of a mold which define the inner surfaces of the walled member of an open metal mesh screen which is meltable by the molten metal which is to be contained. The next step is to transfer, usually by pumping, an alumina-silicon carbide casting compound into the space between the open mesh metal screen and the outer walls defining the mold, which outer walls may be in situ structures. If an existing walled member is being repaired, any damaged or worn portions of the existing walled member are removed and the casting compound is poured in to replace these portions. The next step is to apply heat to dry the casting compound while the open mesh screen of the mold remains in place in contact with the casting compound. The final step involves removing the open screen mesh by flowing hot molten metal into the open top, walled containment member.

32 Claims, 1 Drawing Sheet

U.S. PATENT DOCUMENTS

| | | |
|---|---|---|
| 1,656,312 | 1/1928 | Black . |
| 1,678,976 | 7/1928 | Durfee . |
| 1,710,931 | 4/1929 | Klein . |
| 2,301,101 | 11/1942 | Welshans . |
| 3,396,961 | 8/1968 | Farrington . |
| 3,492,383 | 1/1970 | Heimgartner . |
| 3,672,649 | 6/1972 | Allen . |
| 3,703,348 | 11/1972 | Pivar . |
| 3,885,016 | 5/1975 | Pivar . |
| 3,916,047 | 10/1975 | Niesen . |
| 4,078,292 | 3/1978 | Porter . |
| 4,279,844 | 7/1981 | Danjyo et al. . |
| 4,364,798 | 12/1982 | Costa . |
| 4,438,906 | 3/1984 | English . |
| 4,442,050 | 4/1984 | Takuo . |
| 4,469,309 | 9/1984 | Takashima et al. . |
| 4,480,820 | 11/1984 | Zhukov et al. . |

METHOD FOR MANUFACTURING AND REPAIRING MOLTEN METAL CONTAINMENT VESSELS

This application is a division of application number 08/153,266, filed Nov. 15, 1993, (pending), which is a continuation of application Ser. No. 07/893,377, filed Jun. 4, 1992, now abandoned, which was a continuation of application Ser. No. 07/673,954, filed Mar. 22, 1991, now abandoned.

BACKGROUND AND SUMMARY OF THE INVENTION

This invention relates to a method of manufacturing open top, walled members such as troughs, runners, ladles and other vessels-which are used for containing and processing molten iron and steel. It is well known in the art that such open, top walled members must have sufficient structural integrity to support a molten metal poured therein. This invention provides walled containment members that can be dried faster than conventionally-constructed containment members and which have fewer porosity problems and imperfections, especially at the tops of the walled containment members where the walls are in contact with slags contained in the molten iron and metal.

This invention is especially advantageous when the casting compound described in U.S. patent application No. 07/527,033, filed May 21, 1990, and assigned to the same assignee as this patent application, is used to form the walled containment members since the need for cranes and hoppers to transport the casting compound to the molds and the steel plates which make up the conventional inner walls of the molds are eliminated. The entire disclosure of said patent application is incorporated herein by reference.

Conventionally, troughs and runners for transporting molten iron and steel are constructed in situ near a tap spout of a blast furnace or other molten metal container. The mold for the trough or runner utilizes the existing walls of a trench or, other existing structure as the outer (lower) walls of the mold. The inner (upper) walls of such molds have conventionally been formed of heavy steel plates spaced from the outer walls leaving only an open space between the outer and inner mold walls in which to pour the casting compound and to provide a venting area for the release of moisture during setting of the casting compound. In the past, the drying process, which is necessary to properly cure the casting compound, could not be started until the casting compound had set sufficiently to allow removal of the heavy steel plates of the inner walls of the mold because of the limited venting area for the release of moisture during the drying of the casting compound, which venting area was provided around the top periphery of the mold between the inner and outer walls thereof. When the trough or runner is out of service, the furnace or molten metal container is out of service and each hour a furnace is out of service is costly.

In accordance with my invention, the inner mold walls which conventionally had been constructed of heavy steel plate are replaced with an open mesh, galvanized steel screen of the type which has been used in retaining poured concrete in conventional building construction. The removal of the open mesh screen by the introduction of molten metal after the casting compound has been completely dried is one distinguishing feature of my method in comparison with the use of similar mesh in concrete building construction where the mesh remains as a structural element of the completed concrete construction. In my method, the use of the open mesh screen as the inner walls of the mold permits the drying process for the casting compound to be started as soon as the pouring process ends. It is not necessary to wait for the casting compound to set because the mesh screen is not removed during the drying process. There are adequate openings in the mesh screen to permit venting of moisture from the drying compound and, in fact, the mesh screen is not removed until it is melted by the molten metal being introduced into the finished trough or runner. Also, since the mesh screen is lightweight and the casting compound is of a consistency that it can be pumped into the mold cavity, cranes and hoppers are not needed in the construction of the troughs and runners according to my method, thereby reducing the cost of such an installation.

My invention is also adaptable to the repair and reconstruction of worn troughs, runners, ladles and other vessels used for containing and processing molten iron and steel. Repair and reconstruction is accomplished by removing damaged refractory material, installing the open mesh screen as the inner walls of the mold and pouring in replacement casting compound. The replacement casting compound is pumped between the screen and the remaining original compound walls. As in the case of original installation, the drying process may be started immediately without waiting for the casting compound to set and the inner mold walls to be removed.

BRIEF DESCRIPTION OF THE DRAWINGS

The invention is illustrated more or less diagrammatically in the following drawings wherein.

DESCRIPTION OF THE PREFERRED EMBODIMENTS

Figure 1:
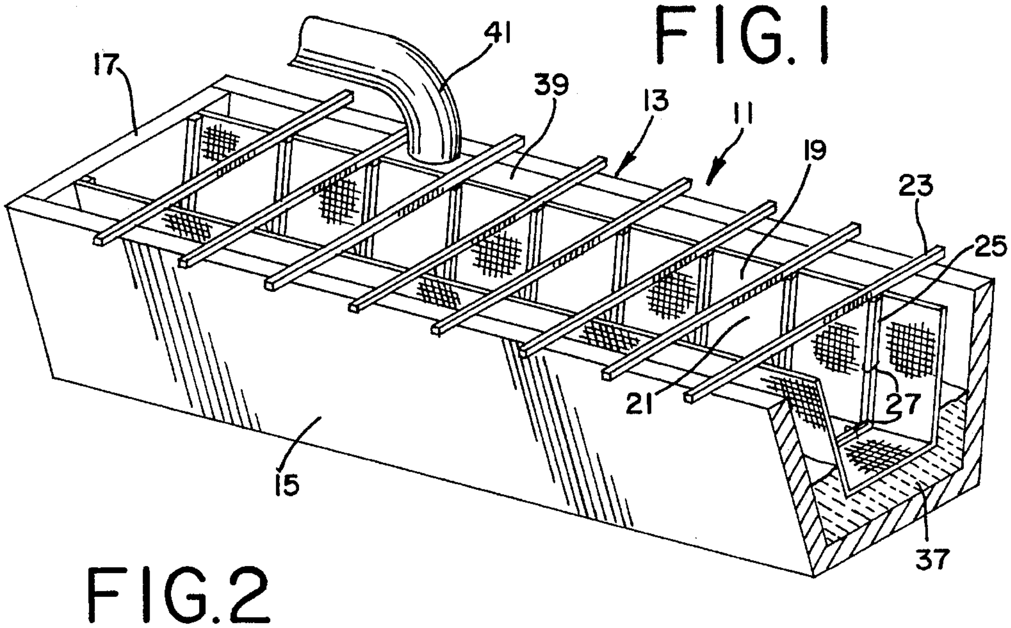
FIG. 1 is a partial perspective view showing the method of this invention in which a casting compound is pumped into a trough mold with the inner walls of the mold being formed of an open mesh metal.
Figure 2:
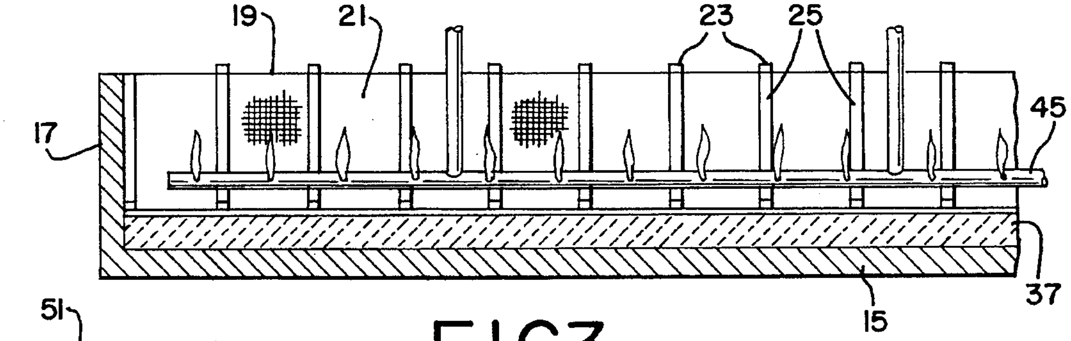
FIG. 2 is a longitudinal, cross-sectional view of the mold of FIG. 1 with the casting compound filling the space between the mold walls and heat being applied to the mold to dry the casting compound.
Figure 3:
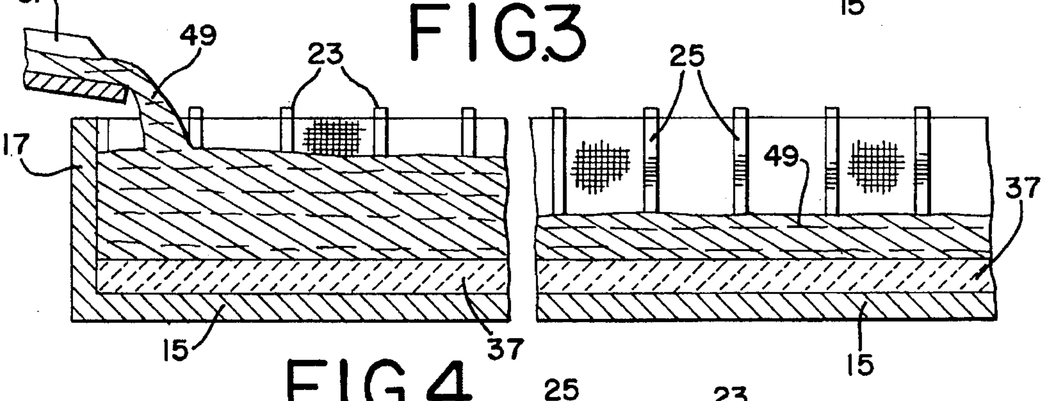
FIG. 3 is a broken, longitudinal, cross-sectional view of molten metal being poured into the finished trough with the molten metal melting the wire mesh of the inner walls of the mold and its supporting framework.

FIGS. 1–3 of the drawings show the method of my invention adapted to the manufacture of an open top, walled structure such as a trough or runner 11 which is used as a containment member to transfer molten metal, such as iron and steel, from a source of molten metal such as the tap hole of a blast furnace or converter. The trough is formed by a mold 13. The outer wall 15 of mold 13 may be an in situ formation such as a concrete, stone or brick trench. The end wall 17 of the trough is also an in situ structure and may be the wall of a blast furnace or other molten metal-containing source. As a novel aspect of my invention, the inner or upper walls 19 of the mold are formed of an open mesh, galvanized steel screen 21. The screen 21 is obtained by lancing and expanding galvanized sheet steel to form expanding mesh portions having openings in the shape of parallelograms. No barriers are inserted across each mesh opening so as to allow air to freely flow therethrough to dry the casting compound. V-shaped ribs are formed between the expanded mesh portions of the screen. A screen of this type is sold by Alabama Metal Industries Corp. of Birmingham, Ala. under the name "Stay-Form". Of course, other screens with similar characteristics may also be used. Screens of this type have been conventionally used as leave-in-place mold walls for concrete building construction with the screens functioning as permanent parts of the hardened concrete walls.

In order to hold the open mesh metal screen in place during the pouring of the casting compound, a framework 23 consisting of rectangular steel tubes 25 connected together by wire ties 27 is supported on the concrete wall 15 of the mold.

A casting compound 37, which in the preferred embodiment of my invention is an alumina-silicon carbide refractory of the type described in U.S. patent application No. 07,527,033, filed May 21, 1990. A preferred casting composition preferably includes, as a major component, a refractory base material in an amount of between 55–90% by weight. The refractory base material preferably has an average particle diameter of between 30 micrometers and 7 millimeters and preferably is composed of calcined clay, mullite, brown fused alumina, tabular alumina or mixtures thereof. When calcined clay or mullite is utilized, the amount is preferably between 60–75% by weight. When brown fused alumina is used, the amount is preferably between 65–80% by weight. For tabular alumina, the amount is preferably between 70–90% by weight.

In addition to the refractory material, the casting composition preferably includes silicon carbide in an amount of between 1–35% by weight, and more preferably in an amount of between 5–25% by weight. The silicon carbide preferably has an average diameter of between 30 micrometers and 1.5 millimeters.

The casting composition may optionally include 2–10% by weight of graphite which ultimately acts as a nonwetting agent to prevent attachment to or penetration of the base material by slag. The graphite may be amorphous or crystalline or in the form of flakes.

The casting composition also includes a silica binder which is formed from finely dispersed (preferably colloidal) silica particles in an aqueous medium. Silica having an average diameter of preferably between 4–100 millimicrons, and most preferably 8–20 millimicrons, is initially dispersed in water in an amount of between 15–70% by weight, preferably about 40% by weight. The resulting colloidal silica binder is then mixed with the other components of the casting composition in an amount of between 8–14% based on the weight of the resulting composition.

The casting composition preferably includes between 0.02–1% of a setting agent. Examples of suitable setting agents are calcium aluminate cement and magnesium oxide. Finally, the casting composition preferably includes between 5–20% by weight of calcined alumina and between 1–10% by weight of microsilica.

The calcined alumina reacts with the silica binder to form a sediment phase which causes improved binding characteristics, particularly at higher temperatures. The calcined alumina preferably has an average diameter of 0.2–70 microns. The microsilica improves the initial flow characteristics of the casting composition. The microsilica preferably has an average diameter of 0.1–1.0 microns, and most preferably between 0.15–0.25 microns. The casting compound is pumped into the void space 39 between the open mesh screen 21 and the outer wall 15 of the mold through a flexible tube 41.

As soon as the space between the outer wall 15 and open mesh metal screen 21 forming the inner walls of the mold 13 is filled with casting compound 37, I install a temporary perforated gas pipe 45 running along the length of the mold and ignite the gas, as shown in FIG. 2 of the drawings, to provide heat to dry the casting compound. The casting compound 37 can be dried with the open mesh metal screen 21 which forms the inner walls 19 of the mold remaining in place. The casting compound is heated until the outer face or cold face of the casting compound reaches a temperature of 220° F.

The use of the open mesh screen 21 as the inner walls 19 of the mold 13 provides additional venting area for release of the moisture in the casting compound than is provided in the conventional mold arrangement because the moisture can escape through the open mesh walls, not just through the open top of the mold. Accordingly, there is accelerated air curing of the casting compound due to the additional venting area allows for more moisture to be released from the casting compound. Furthermore, the build-up of bubbles and porosity in the dried casting compound at the top of the trough, which occurs in troughs formed by conventional casting methods, is reduced substantially or eliminated following the casting method of my invention.

As shown in FIG. 3 of the drawings, it is not necessary to remove the open mesh metal screen 21 or its supporting framework 23 of rectangular steel tubing 25, even after the casting compound 37 has been completely dried. The molten metal, which is iron or steel 49, may be poured from a tap hole of a furnace through a spout 51 which dumps the molten metal into the trough 11 and melts away both the open mesh metal screen 21 and the supporting framework 23.

Figure 4:
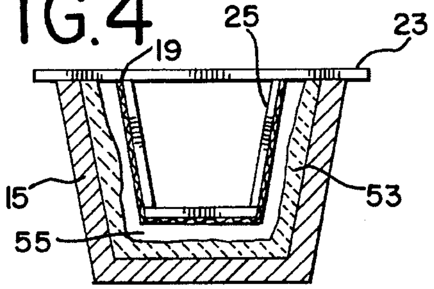
FIG. 4 is a lateral cross-sectional view of a trough showing the application of the method of the invention to the repair of a worn trough.

The method of my invention is also adaptable to repair and reconstruct worn troughs, runners, ladles and other vessels used for containing and processing molten iron and steel. The repair of such a damaged or worn trough 11 would be accomplished in the manner shown in FIG. 4 of the drawings. All broken or damaged portions of the casting compound 53 forming the walls of the trough are removed. Inner mold walls 19 constructed of open mesh metal screen 21 are installed and are supported by a framework 23 of rectangular steel tubing 25. A casting compound 37 is poured into the space 55 between the metal screen 21 and the old casting compound 53 still remaining to form a rebuilt wall.

While the embodiments of the invention disclosed herein are presently considered to be preferred, it is understood that various modifications and improvements can be made without departing from the spirit and scope of the invention. The scope of the invention is indicated in the appended claims and all changes which come within the meaning and range of equivalence of the claims are intended to be embraced therein.

I claim:

1. A method of manufacturing an open top, walled member, having side walls and a bottom surface, of a molten metal containment vessel, said open top, walled member having sufficient structural integrity to support a molten metal poured in said open top, walled member, said method comprising the steps of:

forming an inner wall of a mold having inner side walls and a bottom surface with a perforated sheet metal screen having a plurality of openings to allow air to freely flow therethrough and of a sufficient number to allow air curing, wherein said inner wall defines inside surfaces of said side walls and said bottom surface of said open top, walled member;

transferring a casting compound between an outer wall of said mold and said perforated sheet metal screen of said inner wall to form said open top, walled member having said side walls and said bottom surface;

applying heat to dry said casting compound while said perforated sheet metal screen of said inner wall of said mold remains in place in contact with said casting compound such that said plurality of openings in said perforated sheet metal screen allow air to freely flow therethrough to dry said casting compound so as to form said open top, walled member having said sufficient structural integrity to support a molten metal poured in said open top, walled member of said molten metal containment vessel; and removing said perforated sheet metal screen in contact with said casting compound.

2. The method of claim 1, wherein said casting compound comprises a colloidal silica binder.

3. The method of claim 2, wherein said casting compound comprises 8 to 14% of said colloidal silica binder.

4. The method of claim 1, wherein said step of removing said perforated sheet metal screen comprises flowing molten metal into said open top, walled member to melt said perforated sheet metal screen.

5. The method of claim 1, wherein said transferring step comprises pumping said casting compound.

6. The method of claim 1, wherein said perforated sheet metal screen of said inner wall of said mold is supported by a framework of steel tubing.

7. The method of claim 6, comprising the step of: removing said framework of steel tubing by flowing molten metal into said open top, walled member to melt said framework of steel tubing.

8. The method of claim 1, wherein said step of applying heat comprises positioning open flames adjacent to said perforated sheet metal screen of said inner wall of said mold.

9. A method of manufacturing an open top, walled member, having side walls and a bottom surface of a molten metal containment vessel, said open top, walled member having sufficient structural integrity to support a molten metal poured in said open top, walled member, said method comprising the steps of:

forming an inner wall of a mold having inner side walls and a bottom surface with a perforated sheet metal screen having a plurality of openings to allow air to freely flow therethrough and of a sufficient number to allow air curing, wherein said inner wall defines an inside surface of said open top, walled member;

transferring a casting compound comprising a colloidal silica binder between an outer wall of said mold and said perforated sheet metal screen of said inner wall to form said open top, walled member of said molten metal containment vessel, having said side walls and said bottom surface; and applying heat to dry said casting compound while said perforated sheet metal screen of said inner wall of said mold remains in place in contact with said casting compound such that said plurality of openings in said perforated sheet metal screen allow air to freely flow therethrough to dry said casting compound so as to form said open top, walled member having said sufficient structural integrity to support a molten metal poured in said open top, walled member of said molten metal containment vessel.

10. The method of claim 9, wherein said casting compound comprises 8 to 14% of said colloidal silica binder.

11. The method of claim 9, comprising the step of:

removing said perforated sheet metal screen in contact with said casting compound.

12. The method of claim 11 wherein said step of removing said perforated sheet metal screen comprises flowing molten metal into said open top, walled member to melt said perforated sheet metal screen.

13. The method of claim 9, wherein said transferring step comprises pumping said casting compound.

14. The method of claim 9, wherein said perforated sheet metal screen of said inner wall of said mold is supported by a framework of steel tubing.

15. The method of claim 14, comprising the step of: removing said framework of steel tubing by flowing molten metal into said open top, walled member to melt said framework of steel tubing.

16. The method of claim 9, wherein said step of applying heat comprises positioning open flames adjacent to said perforated sheet metal screen of said inner wall of said mold.

17. A method of repairing an open top, walled member of a molten metal containment vessel, which, when repaired, contains a molten metal, comprising the steps of:

removing a damaged or worn portion of a section of said open top, walled member;

forming an inner wall of a mold inside of said open top, walled member with a perforated sheet metal screen having a plurality of openings to allow air to freely flow therethrough and of a sufficient number to allow air curing;

transferring a casting compound between said section of said open top, walled member and said perforated sheet metal screen of said mold to repair said section of said open top, walled member;

applying heat to dry said casting compound while said perforated sheet metal screen of said inner wall of said mold remains in place in contact with said casting compound such that said plurality of openings in said perforated sheet metal screen allow air to freely flow therethrough to dry said casting compound; and removing said perforated sheet metal screen in contact with said casting compound to provide said repaired open top, walled member of said molten metal containment vessel, which repaired open top, walled member has sufficient structural integrity to support molten metal poured in said open top, walled member of said molten metal containment vessel.

18. The method of claim 17, wherein said casting compound comprises a colloidal silica binder.

19. The method of claim 18, wherein said casting compound comprises 8 to 14% of said colloidal silica binder.

20. The method of claim 17, wherein said step of removing said perforated sheet metal screen comprises flowing molten metal into said open top, walled member to melt said perforated sheet metal screen.

21. The method of claim 17, wherein said transferring step comprises pumping said casting compound.

22. The method of claim 17, wherein said perforated sheet metal screen of said inner wall of said mold is supported by a framework of steel tubing.

23. The method of claim 22, comprising the step of: removing said framework of steel tubing by flowing molten metal into said open top, walled member to melt said framework of steel tubing.

24. The method of claim 17, wherein said step of applying heat comprises positioning open flames adjacent to said perforated sheet metal screen of said inner wall of said mold.

25. A method of repairing an open top, walled member of a molten metal containment vessel, which, when repaired, contains a molten metal, comprising the steps of:

removing damaged or worn portions of a section of said open top, walled member;

forming an inner wall of a mold inside of said open top, walled member with a perforated sheet metal screen having a plurality of openings to allow air to freely flow therethrough and of a sufficient number to allow air curing;

transferring a casting compound comprising colloidal silica binder between said section of said open top, walled member and said perforated sheet metal screen of said mold to repair said section of said open top, walled member of said molten metal containment vessel; and applying heat to dry said casting compound while said perforated sheet metal screen of said inner wall of said mold remains in place in contact with said casting compound such that said plurality of openings in said perforated sheet metal screen allow air to freely flow therethrough to dry said casting compound so as to provide said repaired open top, walled member with sufficient structural integrity to support molten metal poured in said open top, walled member of said molten metal containment vessel.

26. The method of claim 25, wherein said casting compound comprises 8 to 14% of said colloidal silica binder.

27. The method of claim 25, comprising the step of:

removing said perforated sheet metal screen in contact with said casting compound.

28. The method of claim 27 wherein said step of removing said perforated sheet metal screen comprises flowing molten metal into said open top, walled member to melt said perforated sheet metal screen.

29. The method of claim 25, wherein said transferring step comprises pumping said casting compound.

30. The method of claim 25, wherein said perforated sheet metal screen of said inner wall of said mold is supported by a framework of steel tubing.

31. The method of claim 30, comprising the step of: removing said framework of steel tubing by flowing molten metal into said open top, walled member to melt said framework of steel tubing.

32. The method of claim 25, wherein said step of applying heat comprises positioning open flames adjacent to said perforated sheet metal screen of said inner wall of said mold.

* * * * *